(12) United States Patent
Alsoryai (10) Patent No.: US 10,005,931 B2
(45) Date of Patent: Jun. 26, 2018

(54) ADHESIVE FORMULATIONS FOR CARPETS

(71) Applicant: Abdulaziz Nasser Alsoryai, Jeddah (SA)

(72) Inventor: Abdulaziz Nasser Alsoryai, Jeddah (SA)

( * ) Notice: Subject to any disclaimer, the term of this patent is extended or adjusted under 35 U.S.C. 154(b) by 0 days. days.

(21) Appl. No.: 14/290,991

(22) Filed: May 30, 2014

(65) Prior Publication Data
US 2016/0298003 A1 Oct. 13, 2016

Related U.S. Application Data

(60) Provisional application No. 61/891,894, filed on Oct. 16, 2013.

(51) Int. Cl.
| | | |
|---|---|---|
| C09J 129/04 | (2006.01) |
| C08F 216/06 | (2006.01) |
| C08F 218/08 | (2006.01) |
| C09J 4/06 | (2006.01) |
| D05C 17/02 | (2006.01) |
| C09J 11/04 | (2006.01) |
| C09J 11/06 | (2006.01) |
| D06N 7/00 | (2006.01) |
| C08K 3/26 | (2006.01) |
| C08K 5/00 | (2006.01) |
| C08K 5/41 | (2006.01) |
| C08K 3/30 | (2006.01) |

(52) U.S. Cl.
CPC ........... *C09J 129/04* (2013.01); *C08F 216/06* (2013.01); *C08F 218/08* (2013.01); *C09J 4/06* (2013.01); *C09J 11/04* (2013.01); *C09J 11/06* (2013.01); *D05C 17/02* (2013.01); *D06N 7/0073* (2013.01); *C08K 3/26* (2013.01); *C08K 5/0058* (2013.01); *C08K 5/41* (2013.01); *C08K 2003/262* (2013.01); *C08K 2003/3045* (2013.01)

(58) Field of Classification Search
None
See application file for complete search history.

(56) References Cited

U.S. PATENT DOCUMENTS

| | | | | | |
|---|---|---|---|---|---|
| 3,775,366 | A | * | 11/1973 | Kasulin et al. | C08K 5/378 524/425 |
| 4,371,576 | A | * | 2/1983 | Machell | D04H 11/04 156/72 |
| 4,576,665 | A | * | 3/1986 | Machell | D04H 11/04 156/435 |
| 5,206,304 | A | * | 4/1993 | Hellwig | C07D 251/38 525/329.3 |
| 5,560,972 | A | * | 10/1996 | Blakely | B32B 5/26 428/92 |
| 2008/0113146 | A1 | * | 5/2008 | Wright | B29B 17/02 428/95 |
| 2008/0233336 | A1 | * | 9/2008 | Giannopoulos | D06N 7/0081 428/95 |
| 2016/0298003 | A1 | * | 10/2016 | Alsoryai | C08F 216/06 |

* cited by examiner

*Primary Examiner* — Peter A Salamon
(74) *Attorney, Agent, or Firm* — IP Law Leaders PLLC (57) ABSTRACT

The invention provides carpet bonding agents with improved flow properties and improved strength and physical properties when compared to conventional binder systems for carpets. Thus, in various embodiments, the invention provides an adhesive formulation comprising a carpet latex formulation; a plasticized carpet latex; a waterproof additive; a defoamer; and an antibacterial. The invention also provides uses of the materials and combinations of the materials described herein.

18 Claims, 6 Drawing Sheets

WACKER POLYMERS TENSILE & ELONGATION
TEXT INPUTS: SAMPLE ID    C                                    90% EVA
                                                              10% 229 BLEND

|         | MAXIMUM LOAD (lbf) | ELOGATION @ BREAK (%) | BREAK LOAD (lbf) | THICKNESS (In) | WACKER TOUGHNESS | MODULUS (YOUNG'S TENSILE STRESS 0 In - 0 In) (psi) |
|---------|---|---|---|---|---|---|
| 1       | 8.40 | 1852.67 | 8.40 | 0.039 | 612.60 | 34.20 |
| 2       | 11.38 | 1998.66 | 11.38 | 0.039 | 895.09 | 38.95 |
| AVERAGE | 9.89 | 1925.67 | 9.89 | 0.039 | 753.85 | 36.57 |

|         | TEST DATE |
|---------|---|
| 1       | FRIDAY, JUNE 08, 2012 |
| 2       | FRIDAY, JUNE 08, 2012 |
| AVERAGE | |

WACKER POLYMERS TENSILE & ELONGATION
TEXT INPUTS: SAMPLE ID    C WET

|         | MAXIMUM LOAD (lbf) | ELOGATION @ BREAK (%) | BREAK LOAD (lbf) | THICKNESS (In) | WACKER TOUGHNESS | MODULUS (YOUNG'S TENSILE STRESS 0 In - 0 In) (psi) |
|---------|---|---|---|---|---|---|
| 1       | 1.10 | 2051.33 | 1.10 | 0.039 | 89.01 | 11.81 |
| 2       | 1.07 | 2049.02 | 1.07 | 0.039 | 85.95 | 12.31 |
| AVERAGE | 1.08 | 2050.18 | 1.08 | 0.039 | 87.48 | 12.06 |

|         | TEST DATE |
|---------|---|
| 1       | FRIDAY, JUNE 08, 2012 |
| 2       | FRIDAY, JUNE 08, 2012 |
| AVERAGE | |

ADHESIVE FORMULATIONS FOR CARPETS

RELATED APPLICATIONS

This application claims priority under 35 U.S.C. § 119(e) to U.S. Provisional Patent Application No. 61/891,894, filed Oct. 16, 2013, which is incorporated herein by reference.

BACKGROUND OF THE INVENTION

As noted in U.S. Pat. No. 5,560,972, carpet construction can vary but generally a pile carpet is manufactured in one of two ways. The pile yarn may be woven or tufted through a primary backing. The yarn is then secured to the primary backing with adhesive. This type of carpet in which yarn is mechanically as well as adhesively attached to backing is generally termed "woven" or "tufted" carpet. Alternatively, yarn may be cut or looped and positioned to form a pile layer that is then secured to the primary backing with adhesive. Carpet of this type of commonly referred to as "fusion bonded" carpet.

Fusion bonded carpet is generally categorized by the way the pile yarn layer is produced. In an "I-tuft" process, yarn is first cut into short, straight strands, and then the yarn ends are bonded to a primary support backing with adhesive. In a "U-tuft" process, a pile yarn layer is formed of folded yarn strands. The folded sections of the strands are then secured to the primary backing with an adhesive layer such that in the final carpet product, both ends of each cut strand protrude from the adhesive base.

Fusion bonded carpets typically use a non-latex polyvinyl chloride (PVC) plastisol formulation as the bonding adhesive layer that penetrates into the support layer. The adhesive layer is then contacted with pile forming yarn. The PVC plastisol is cured, creating a product in which the yarn fibers are secured in the PVC later and thereby bonded to the support layer. Increased strength may be obtained by bonding the secondary backing to the support layer.

In order to make a durable fusion bonded carpet in which the support layer does not peel away from the secondary backing, the adhesive which has permeated into the support layer must contact and bond with the material forming or adhering the secondary backing. The use of a non-latex plasticized PVC as the yarn locking adhesive limits the variety of backing structures that may be applied to the carpet. This is true because non-latex PVC plastisol does not bond strongly to common carpet backing materials such as bitumen, EVA (ethylene-vinyl acetate), APP (atactic polypropylene), hot melts, urethanes, and SBR (styrene-butadiene). Furthermore, SBR (styrene-butadiene) is relatively expensive, and PVC plastisol is both relatively expensive and presents environmental concerns due to its chloride content.

A fusion bonded carpet which does not use PVC as the pile yarn adhesive is described in U.S. Pat. Nos. 4,371,576 and 4,576,665. The carpet is prepared by forcing a heated hot melt adhesive through a liquid permeate support layer to contact with the pile forming yarn on the opposite side of the base layer. The adhesive is then allowed to cool, during which time the pile forming yarn and support layer are secured.

Hot melt adhesives have been known for many years and usually include a thermoplastic resin, wax and a polymeric adhesive. Hot melt adhesives are applied at high temperature, and cured at cooling.

U.S. Pat. No. 3,775,366 discloses a process for crosslinking compounds by exclusively using triazines as the cross-linking agent for natural and synthetic rubbers. More specifically, the '366 patent relates to a process of cross-linking synthetic rubber containing fillers or mixtures containing these materials without the use of elemental sulfur with heat and possibly pressure.

U.S. Pat. No. 5,206,304 describes the use of bis(2,4-organylthio-s-triazine-6-yl) polysulfides as accelerators in vulcanizable rubber mixtures including SBR. The bis(2,4-organylthio-s-triazine-6-yl) polysulfides in the '304 patent are described as rubber mixtures such as those customarily used in tire construction and to industrial articles such as e.g. mixtures for conveyor belts, V belts, molded articles, hoses with and without linings, rubber coatings for rollers, jacketings, injection profiles, free-hand articles, foils, shoe soles and top parts, cables, all-rubber tires and their vulcanizates.

U.S. Pat. No. 5,560,972 discloses a fusion bonded carpet in which the pile yarn is secured in a non-hot-melt latex adhesive base and methods of manufacture of such carpet. The viscosity of the latex formulation (latex polymer in aqueous solution) is described as ranging from 20,000-150,000 cps (centipoise), with an optimal range of 40,000-120,000 cps. Claim 1 of the '972 patent describes a latex bonded carpet that can include a non-hot melt latex adhesive base; wherein the latex adhesive has a viscosity ranging between 40,000 and 150,000 cps prior to any curing, and wherein the non-hot melt latex adhesive can include vinyl acetate-ethylene, ethylene-vinyl acetate and styrene-butadiene all as part of the latex adhesive itself.

U.S. Patent Publication Number 20080113146 pertains to carpet and methods of making and recycling carpet. In one aspect, the carpet includes: a primary backing which has a face and a back surface; a plurality of fibers attached to the primary backing and extending from the face of the primary backing and exposed at the back surface of the primary backing; an adhesive composition backing; and an optional secondary backing adjacent to the adhesive backing. In claim 37 of the '146 patent publication, a pre-coat material as claimed recites a combination of VAE emulsion and SBR latex.

There remains a need for bonding agents with improved flow properties and improved strength and physical properties when compared to the conventional binder system for carpets.

SUMMARY OF THE INVENTION

The invention relates to an adhesive formulation that can be used for carpet backing, methods of making the adhesive formulation, and methods of using the adhesive formulation.

One aspect of the invention relates to a carpet latex adhesive formulation (referred to herein as adhesive formulation 1), which comprises: (1) demineralized water; (2) vinyl acetate monomer (VAM); (3) polyvinyl alcohol; (4) potassium per sulphate (PPS); (5) sodium bi-carbonate (SBC); (6) a non-ionic emulsifier (EM-031); (7) an ionic emulsifier (GEOwet); (8) a defoamer; (9) a reducing agent—Safolite; and (10) an antibacterial agent.

Another aspect of the invention relates to adhesive formulation 2 (referred to herein as ANS), wherein adhesive formulation 2 comprises (A) adhesive formulation 1 as described herein, (B) a plasticized carpet latex; (C) a waterproof additive; (D) a defoamer; and (E) an antibacterial agent.

Further aspects and embodiment of the invention will follow from the discussion that follows below.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

In one aspect, the invention relates to an adhesive formulation that can be used for carpet backing to provide superior tensile strength and a stiffer hand. The inventive adhesive formulation is added during batching. After application onto a carpet, the adhesive formulation is dried by means of a heat process, and the adhesive formulation has the unique capability of cross-linking with SBR (styrene-butadiene-rubber) or VAE (vinyl acetate-ethylene) to add value to the adhesion of the Backing to the carpet, and this also adds the value of stronger Tuft-Binds.

The adhesive formulation, which can be described generally as a plasticized bonding agent, (when blended/mixed with any polyvinyl acetate (PVA) related compound that goes onto carpet backing, significantly improves/enhances the physical properties (i.e., Tensile strength and Stiffness of the finished product). The invention being thus described may be varied in many ways by the skilled artisan in the applicable arts. Such variations are not to be regarded as a departure from the spirit and scope of the invention.

The adhesive formulation (ANS) can be combined with EVA to provide a synthetic latex that is cheaper than SBR and enables favorable filler ratios to be used in carpet backing such as, but not limited to, 500 and 550 filler loads. In other embodiments, the adhesive formation can be combined with EVA to provide a carpet backing effective at 600 and 700 filler loads.

Adding the adhesive formulation to EVA provides a product with improved tensile strength and decreased elongation and as such the adhesive formulation enables EVA (i.e., in the form of an EVA-adhesive formulation blend) which can be applied as a coating to the inner surface of the primary backing of a carpet thereby reducing or removing the need for SBR. SBR or VAE can be applied as a secondary coating to the inner surface of the secondary backing. This is one of the advantages of the adhesive formulation (ANS) of the present invention since SBR is more expensive than the EVA-adhesive formulation blend of the present invention.

Definitions

The following definitions are included to provide a clear and consistent understanding of the specification and claims.

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a substance" includes a plurality of such "substances", so that a substance X includes a plurality of substances X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

The term "carpet backing" generally includes both a primary backing and a secondary backing. The primary backing is in contact with the fibers and helps form the carpet's structure. The secondary backing helps to protect the carpet from moisture, bacteria and molds that may actually seep up through the subfloor.

As will be understood by the skilled artisan, all numbers, including those expressing quantities of ingredients, properties, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for carpet components, ranges, are for illustration only; they do not exclude other defined values or other values within defined ranges as described herein.

Carpet Latex Adhesive Formulation (Adhesive Formulation 1)

One aspect of the invention relates to a carpet latex adhesive formulation (adhesive formulation 1) comprising (1) demineralized water; (2) vinyl acetate monomer (VAM); (3) polyvinyl alcohol; (4) potassium per sulphate (PPS); (5) sodium bicarbonate (SBC); (6) a non-ionic emulsifier (EM-031); (7) an ionic emulsifier (GEOwet); (8) a defoamer; (9) a reducing agent—Safolite; and (10) an antibacterial agent. ANS, as described herein, is also referred to as adhesive formulation 1. In another embodiment, the defoamer is BYK®-037 (defoamer). In another embodiment, the antibacterial agent is Nipacide Cxf 4. In another embodiment, EM-031 (non-ionic emulsifier) is alkyl aryl polyethyl alcohol.

In another embodiment, the adhesive formulation 1 comprises (1) de-mineralized water; (2) vinyl acetate monomer (VAM); (3) polyvinyl alcohol; (4) potassium per sulphate (PPS); (5) sodium bi-carbonate (SBC); (6) EM-031 (alkyl aryl polyethyl alcohol) as a non-ionic emulsifier; (7) an ionic emulsifier (GEOwet; (8) BYK®-037 (as a defoamer); (9) Safolite (sulphoxylate); and (10) Nipacide Cxf 4 (antibacterial).

GEOwet (ionic emulsifier) is a wetting agent containing highly concentrated alkylnaphthalene sulfonate powders, and can be obtained from GEO® Specialty Chemicals.

BYK®-037 (defoamer) is an emulsion of paraffinic mineral oils and hydrophobic components. BYK®-037 (defoamer) can be obtained from Altana.

Nipacide CFX 4 is a biocide (antibacterial) manufactured by Clariant UK Ltd. and is a blend of chlorinated and non-chlorinated isothiazolinones plus ethyl glycol bis-sa-hemiformal.

EM-031 (non-ionic emulsifier) is alkyl aryl polyethyl alcohol that can be obtained from Dai-ichi Karkaria limited.

STARFIX FA-A-36 is a resin comprises chlorinated paraffin, calcium carbonate and acrylic copolymer. STARFIX FA-A-36 (resin) can be obtained from Star Adhesive & Resin Ind. Factory, PO Box-26551 Sharjah. UAE.

STARBOND 30-36 is a resin that comprises Styrene Acrylic, $TiO_2$, Styrene Acrylic, $CaCO_3$, and Crystalline silica. The $TiO_2$ in STARBOND 30-36 (resin) ranges from about 2 to about 3 wt %. The $CaCO_3$ in STARBOND 30-36 (resin) ranges from about 15 to about 40 wt %. The crystalline silica in STARBOND 30-36 (resin) ranges from about 6 to about 10 wt %. STARBOND 30-36 (resin) can be obtained from Star Adhesive & Resin Ind. Factory, PO Box-26551 Sharjah. UAE.

Further Embodiments of (Adhesive Formulation 1)

In another embodiment of the carpet latex adhesive formulation (ANS), the de-mineralized water is from about 30 wt % to about 40 wt %.

In another embodiment of adhesive formulation 1, the de-mineralized water is about 35-45 wt %, about 40-42 wt %, about 41 wt %, or about 40.87 wt %.

In another embodiment of adhesive formulation 1, the vinyl acetate monomer is from about 40 wt % to about 70 wt %.

In another embodiment of adhesive formulation 1, the vinyl acetate monomer is about 55.54 wt %.

In another embodiment of adhesive formulation 1, the polyvinyl alcohol is from about 1.0 wt % to about 5 wt %.

In another embodiment of adhesive formulation 1, the polyvinyl alcohol is about 2.50 wt %.

In another embodiment of adhesive formulation 1, the potassium persulphate is from about 0.05 wt % to about 0.20 wt %.

In another embodiment of adhesive formulation 1, the potassium persulphate is about 0.11 wt %.

In another embodiment of adhesive formulation 1, the sodium bi-carbonate is from about 0.10 wt % to about 0.30 wt %.

In another embodiment of adhesive formulation 1, the sodium bi-carbonate is about 0.16 wt %.

In another embodiment of adhesive formulation 1, the non-ionic emulsifier is from about 0.15 wt % to about 0.45 wt %.

In another embodiment adhesive formulation 1, the non-ionic emulsifier is about 0.30 wt %.

In another embodiment of adhesive formulation 1, the ionic emulsifier is from about 0.15 wt % to about 0.45 wt %.

In another embodiment of adhesive formulation 1, the ionic emulsifier is about 0.30 wt. In another embodiment of adhesive formulation 1, the defoamer is from about 0.01 wt % to about 0.10 wt %.

In another embodiment of adhesive formulation 1, the defoamer is about 0.04 wt %. In another embodiment of adhesive formulation 1, the reducing agent is from about 0.005 wt % to about 0.05 wt %.

In another embodiment of adhesive formulation 1, the reducing agent is about 0.01 wt %.

In another embodiment of adhesive formulation 1, the antibacterial is from about 0.10 wt % to about 0.30 wt %.

In another embodiment of adhesive formulation 1, the antibacterial is about 0.17 wt %.

In another embodiment of adhesive formulation 1, the de-mineralized water is about 40.87 wt %; the vinyl acetate monomer is about 55.54 wt %; the polyvinyl alcohol is about 2.50 wt %; the potassium per sulphate is about 0.11 wt %; the sodium bi-carbonate is about 0.16 wt %; the non-ionic emulsifier is EM 031 at about 0.30 wt %; the ionic emulsifier is GEOwet at about 0.30 wt %; the defoamer is BKY®-037 at about 0.04 wt %; the reducing agent is sodium sulphoxylate at about 0.01 wt %; and the antibacterial is Nipacide Cxf 4 at about 0.17 wt %. Other embodiments of the adhesive formulation 1 include any combination the embodiments described above that can be logically be made.

Adhesive Formulation 2 (ANS)

In another embodiment, adhesive formulation 1 is combined with additional components to form adhesive formulation 2 (ANS), wherein ANS comprises (1) the adhesive formulation 1 as described above, (2) a plasticized carpet latex; (3) a waterproof additive; (4) a defoamer; and (5) an antibacterial. In another embodiment of ANS, the plasticized carpet latex is Starfix-FA-A-36 (resin). In another embodiment of ANS, the waterproof additive is Starbond-30-36 (resin). In another embodiment of ANS, the defoamer is BKY®-037. In another embodiment of adhesive formulation 2, the antibacterial is Nipacide Cxf 4.

STARFIX FA-A-36 (resin) is a synthetic resin, with additives, tackyfier and fine grade mineral fillers, and this can be obtained from Star Adhesive & Resin Ind. Factory.

STARBOND 30-36 (resin) is a tough and flexible adhesive and sealant that can be obtained from Paramount Polytreat Chemicals Pvt.

Further Embodiments of Adhesive Formulation 2 (ANS)

In another embodiment, ANS comprises (1) adhesive formulation 1 (ANS) as described above, (2) Starfix-FA-A-36 (resin); (3) (Starbond-30-36 (resin)); (4) BKY®-037 (defoamer); and (5) Nipacide Cxf 4 (antibacterial).

In one embodiment of ANS, adhesive formulation 1 is from about 45 wt % to about 85 wt % of ANS.

In another embodiment of ANS, adhesive formulation 1 is about 65.8 wt % of ANS.

In another embodiment of ANS, the plasticized carpet latex is from about 10 wt % to about 35 wt % of ANS.

In another embodiment of ANS, the plasticized carpet latex is about 22 wt % of ANS.

In another embodiment of ANS, the plasticized carpet latex is comprised from about 35 wt % to about 65 wt % of solids.

In another embodiment of ANS, the plasticized carpet latex is comprised of about 49 wt % of solids.

In another embodiment of ANS, the waterproof additive is from about 5 wt % to about 20 wt % of ANS.

In another embodiment of ANS, the waterproof additive is about 12 wt % of ANS.

In another embodiment of ANS, the defoamer is from about 0.05 wt % to about 0.5 wt % of ANS.

In another embodiment of ANS, the defoamer is about 0.1 wt % of ANS.

In another embodiment of ANS, the antibacterial is from about 0.05 wt % to about 0.5 wt % of ANS.

In another embodiment of ANS, the antibacterial is about 0.1 wt % of ANS.

In another embodiment of ANS, adhesive formulation 1 is about 65.8 wt % of ANS; the plasticized carpet latex is Starfix-FA-A-36 (resin) (49 Wt % solids) at about 22 wt % of ANS; the waterproof additive is Starbond-30-36 (resin) at about 12 wt % of ANS; the defoamer is BKY®-037 at about 0.1 wt % of ANS; the antibacterial is Nipacide Cxf 4 at about 0.1 wt % of ANS.

Another embodiment relates to adhesive formulation 2 (ANS), comprising (1) the adhesive formulation 1 as described in any of the above embodiments; (2) a plasticized carpet latex; (3) a waterproof additive; (4) a defoamer; and (5) an antibacterial wherein the adhesive formulation 1 is about 65.8 wt % of ANS; the plasticized carpet latex is Starfix-FA-A-36 (resin) (49 wt % solids) at about 22 wt % of ANS; the waterproof additive is Starbond-30-36 (resin) at about 12 wt % of ANS; the defoamer is BKY®-037 at about 0.1 wt % of ANS; and the antibacterial is Nipacide Cxf 4 at about 0.1 wt % of ANS.

Other embodiments of the ANS include any combination the embodiments described above for Adhesive Formulation 1 and ANS that can be logically be made.

Products of Adhesive Formulation 2 (ANS) Combined with Ethy Vinyl Acetate

Another aspect of the invention relates to a product formed by combining adhesive formulation 2 (ANS), as defined in any of the embodiments described herein, and ethyl vinyl acetate (EVA). A filler loading can be added to the combination of adhesive formulation 2 and EVA in order to reduce costs of these products. The filler loading that can be added to adhesive formulation 2 to reduce costs can include, without limitation, more deionized water, calcium carbonate; Thickner T-111 Ultrathick; and Foamer Ultrafoam 565.

Application of Adhesive Formulation 2 (ANS) to Carpets

To the face of the carpet, a primary backing can be applied. The primary backing is EVA and ANS with a filler loading, wherein the filler loading is used to reduce the cost. In another embodiment, the ratio of filler loading to ANS ratio ranges from about 2:1 to about 10:1. In another embodiment, the filler loading to ANS ratio ranges from about 3:1 to about 8:1. In another embodiment, the filler loading to ANS ratio ranges from about 4:1 to about 7:1. In another embodiment, the filler loading to ANS ratio ranges from about 5:1 to about 7:1. In another embodiment, the filler loading to ANS ratio is about 5:1. To the back of the carpet, a secondary backing is applied. In another embodiment, the secondary backing contains EVA and ANS without a filler loading.

The examples below depict various adhesive products that can be used for carpet backing. The adhesive formulations disclosed herein are not limited by these examples. One skilled in the art will know that variations in these formulations can be used. In the descriptions below, one of ordinary skill in the art would recognize that various components of these formulations can be substituted with alternative components, and the percentage of each component can modified for these formulations and still fall within the scope of the invention.

EXAMPLES

In the examples below, tensile strength is used to measure how well the carpet sticks to the backing and how effective the delamination is.

Example 1

A 500 filler load with 100% EVA was obtained from commercially available sources (Wacker Products) as a ready-made compound ready to go onto a carpet as a pre-coat. The formulation of this adhesive was prepared by combining the following components: First, EVA is provided; then the water was added; then the calcium carbonate was added, then the ultrafoam 565 was added, and then the Thickner T-111 was added. The amounts of each component used were as follows: (1) EVA 53 from Wacker Products: 170 grams; (2) water: 85.6 grams; (3) calcium carbonate: 536 grams; (4) foamer, ultrafoam 565 from Phoenix Chemical: 4.98 grams; and (5) Thickner T-111 Ultrathick from Phoenix Chemical: 2.42 grams.

Analysis: The tensile strength was 4.93 lbs/in and the elongation was 18.3 inches before break. The tensile strength and elongation for were each measured by the procedure described below.

Example 2

A product containing a 500 filler load with 80% EVA and 20% of ANS was prepared. This product was ready to go onto the carpet as a pre-coat. This product was prepared by combining the following components:

First, both EVA and ANS were added together; then the water was added; then the calcium carbonate was added, then the ultrafoam 565 was added, and then the Thickner T-111 was added. The amounts of each component used were as follows: (1) 70.8 grams of EVA 53 from Wacker Products; (2) polyvinyl acetate (PVA) 22.24 grams; (3) 24.2 grams of water; (4) 278.72 grams of calcium carbonate; (5) 1.64 grams of Thickner T-111 Ultrathick from Phoenix Chemical; and (6) 2.04 grams of foamer, Ultrafoam 565 from Phoenix Chemical.

Analysis: The tensile strength was 7.37. Example 2 had an increase in tensile strength of 49% over Example 1. The elongation was measured to be 4.59 inches before break. The tensile strength and elongation for were each measured by the procedure described below.

Example 3

An adhesive formulation of a 550 filler load with 100% EVA was prepared. This formulation was ready to go onto the carpet as a pre-coat. The formulation of this adhesive was prepared by combining the following components:

First, EVA is provided; then the water was added; then the calcium carbonate was added, then the ultrafoam 565 was added, and then the Thickner T-111 was added. The amounts of each component used were as follows: (1) 163.9 grams of EVA 53 from Wacker Products; (2) 59.84 grams of water; (3) 568.24 grams of calcium carbonate; (4) 3.2 grams of Thickner T-111 Ultrathick from Phoenix Chemical; and (5) 4.8 grams of Foamer Ultrafoam 565 from Phoenix Chemical.

Analysis: The Tensile strength is 5.06 lbs/in. The elongation is 16.67 inches before break. The tensile strength and elongation for were each measured by the procedure described below.

Example 4

A product containing a 550 filler load with 80% EVA and 20% of ANS of the present invention was prepared. This product was ready to go onto the carpet as a pre-coat. The formulation of this adhesive was prepared by combining the following components.

First, both EVA and ANS were added together; then the water was added; then the calcium carbonate was added, then the ultrafoam 565 was added, and then the Thickner T-111 was added. The amounts of each component used were as follows: (1) 114.64 grams of EVA 53 from Wacker Products; (2) 61.92 grams of polyvinyl acetate; (3) 47.84 grams of water; 562.68 grams of calcium carbonate; (4) Calcium Carbonate; (5) 3.2 grams of Thickner T-111 Ultrathick from Phoenix Chemical; and (6) 4.8 grams of Foamer Ultrafoam 565 from Phoenix Chemical.

Analysis: The Tensile strength was 9.61 lbs/in and the elongation was 4.95. Example 4 had an increase in Tensile strength of 89% over Example 3. Both Examples 2 and 4 show an increase in Tensile strength that translates to better delamination (lbs/in that it takes to pull the backing off the carpet after processing). This helps to allow manufacturers to decrease the amount of Latex needed to get their required numbers. The tensile strength and elongation for were each measured by the procedure described below.

Example 5

A 500 filler load with 100% EVA was obtained from commercially available sources (Wacker Products) as a ready-made compound ready to go onto a carpet as a pre-coat. The formulation of this adhesive was prepared by combining the following components:

First, EVA is provided; then the water was added; then the calcium carbonate was added, then the ultrafoam 565 was added, and then the Thickner T-111 was added. The amounts of each component used were as follows: (1) EVA 53 from Wacker Products: (2) 170 grams; (2) water: 85.6 grams; (3) calcium carbonate: 536 grams; (4) Thickner T-111 Ultrathick from Phoenix Chemical: 2.92 grams; (5) foamer, ultrafoam 565 from Phoenix Chemical: 4.98 grams.

Analysis: The tensile strength was 5.8 lbs/in and the elongation was 36 inches before break. The tensile strength and elongation for were each measured by the procedure described below.

Example 6

A product containing a 550 filler load with 80% EVA and 20% ANS of the present invention was prepared. This product was ready to go onto the carpet as a pre-coat. The formulation of this adhesive was prepared by combining the following components:

First, both EVA and ANS were added together; then the water was added; then the calcium carbonate was added; then the ultrafoam 565 was added; and then the Thickner T-111 was added. The amounts of each component used were as follows: (1) 135.28 grams of EVA 53 from Wacker Products; (2) 42.64 grams of polyvinyl acetate; (3) 35 grams of water; (4) 585.9 grams of calcium carbonate; (5) 2 grams of Thickner T-111 Ultrathick from Phoenix Chemical; and (5) 4.98 grams of Foamer Ultrafoam 565 from Phoenix Chemical.

Figure 1:
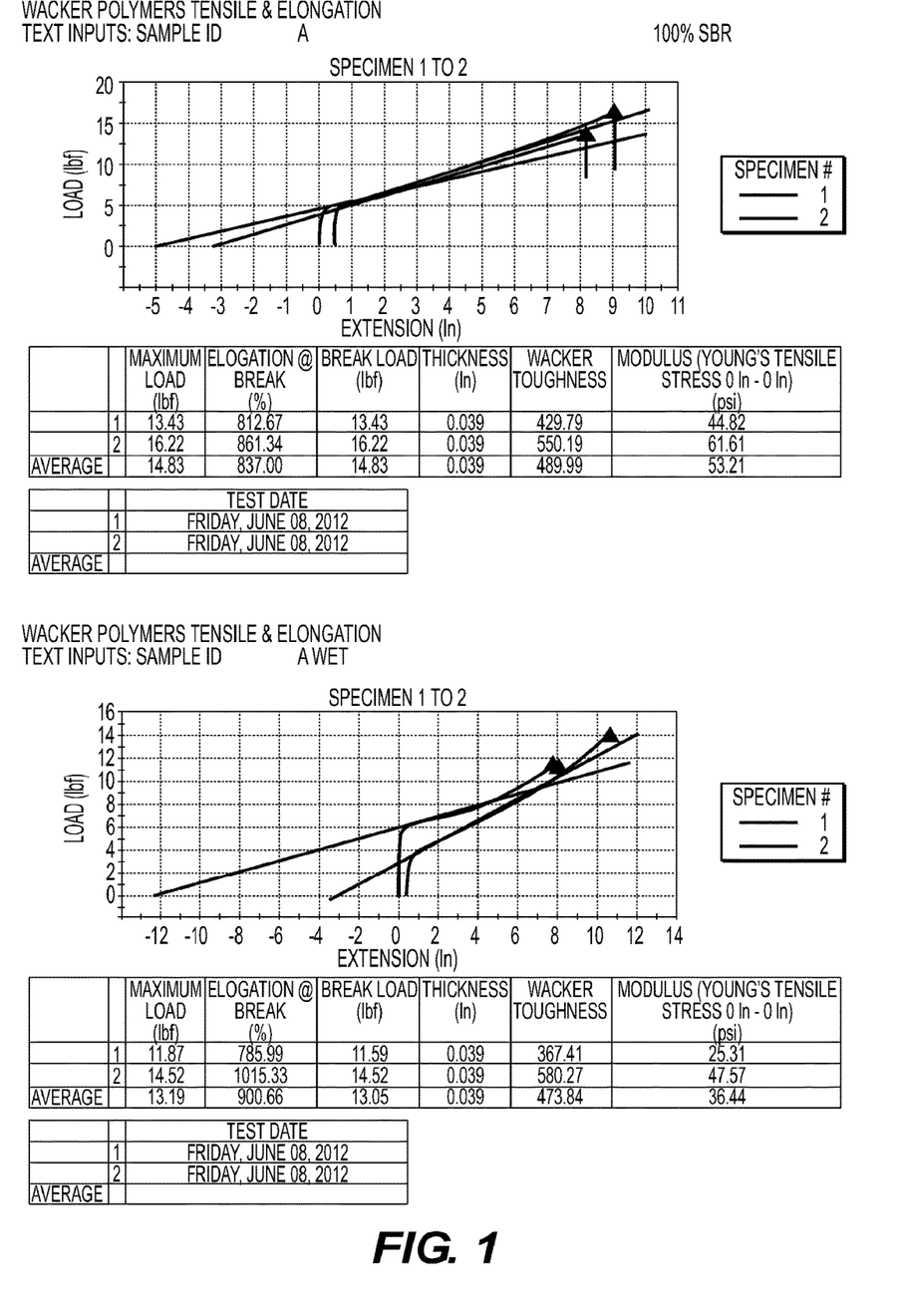
FIG. 1 shows the Wacker Polymers Tensile Elongation graph and results for Example 1.
Figure 2:
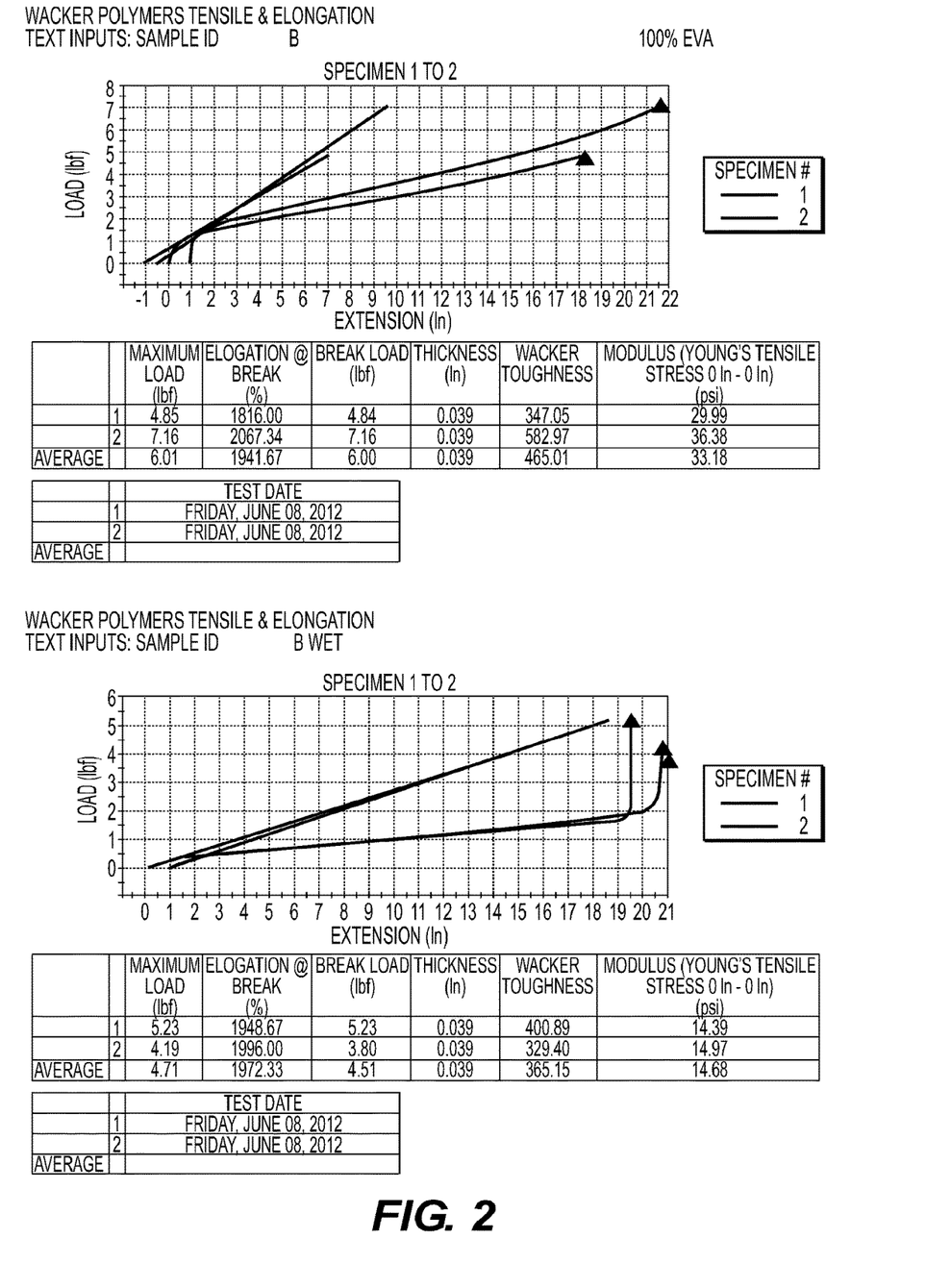
FIG. 2 shows the Wacker Polymers Tensile Elongation graph and results for Example 2.
Figure 3:
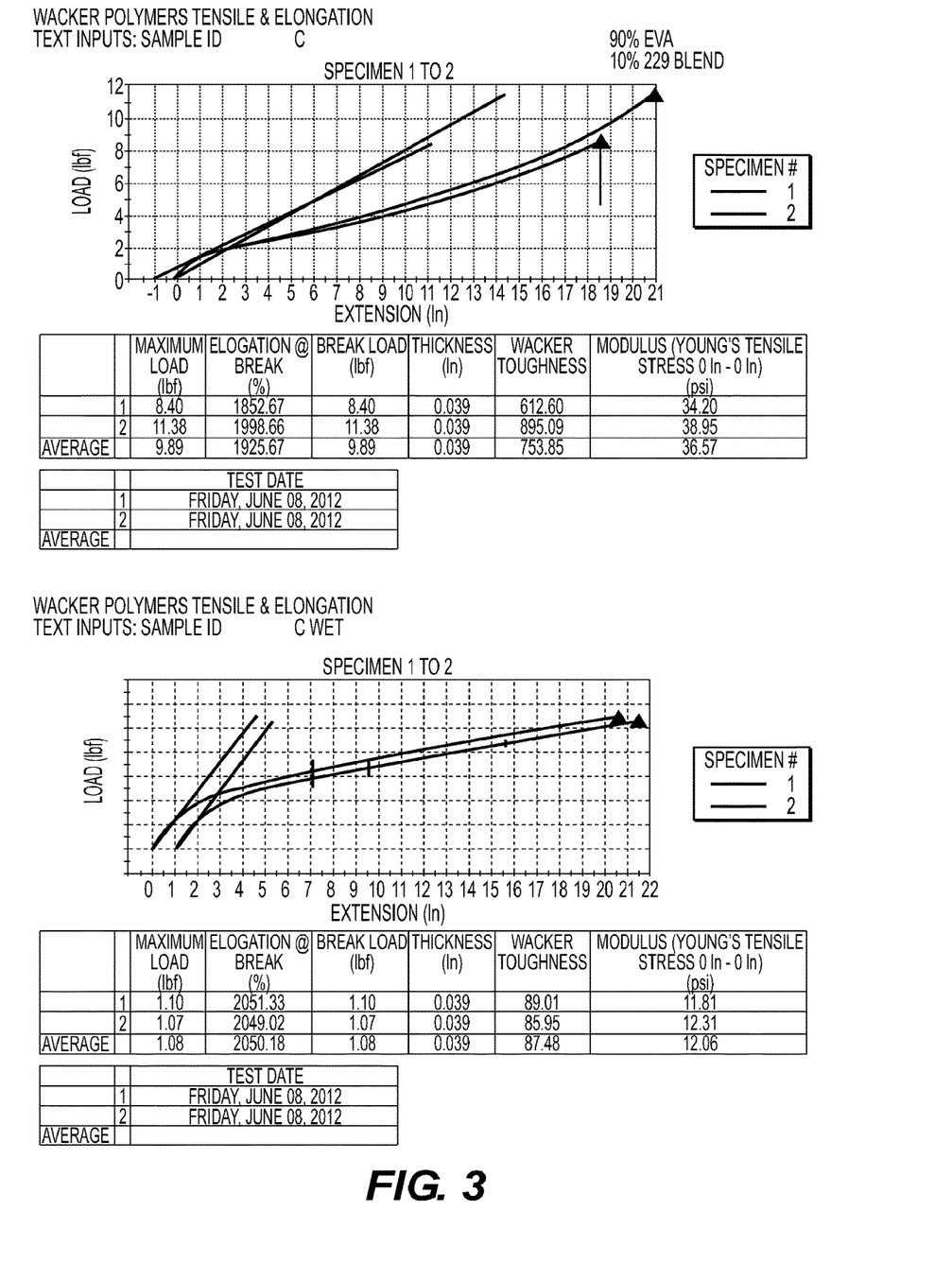
FIG. 3 shows the Wacker Polymers Tensile Elongation graph and results for Example 3.
Figure 4:
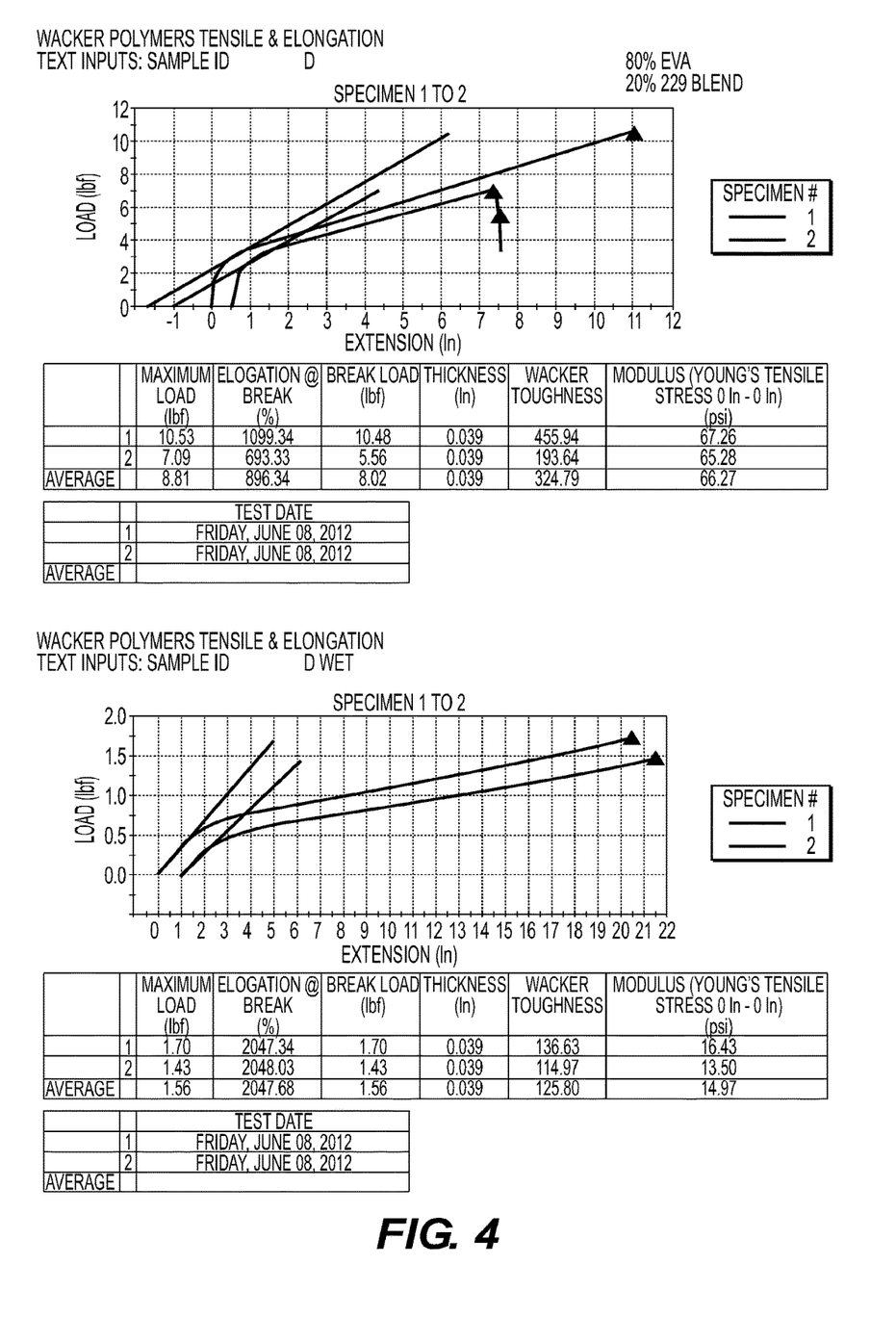
FIG. 4 shows the Wacker Polymers Tensile Elongation graph and results for Example 4.
Figure 5:
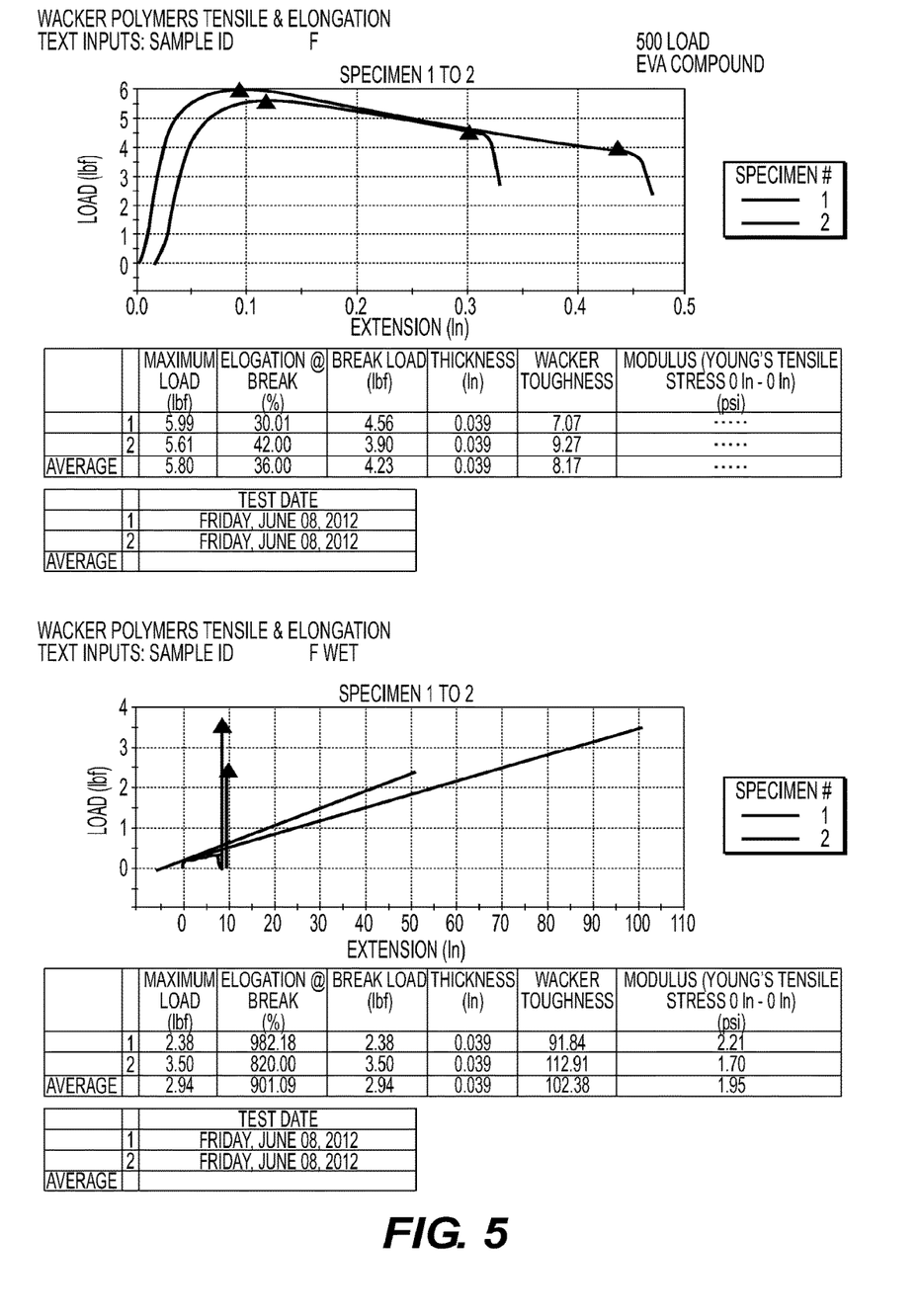
FIG. 5 shows the Wacker Polymers Tensile Elongation graph and results for Example 5.
Figure 6:
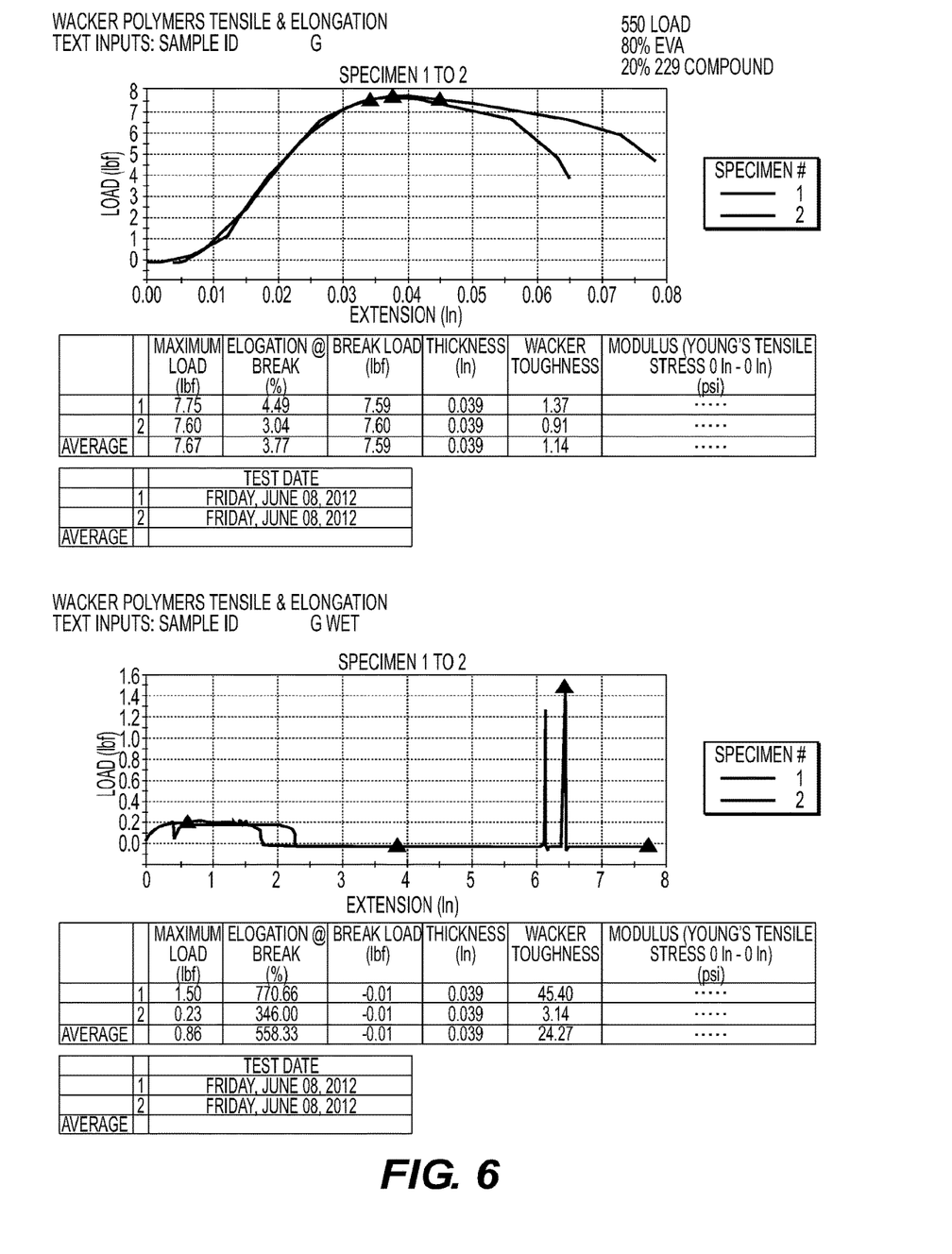
FIG. 6 shows the Wacker Polymers Tensile Elongation graph and results for Example 6.

Analysis: The Tensile strength was 7.67 lbs/in and the elongation was 3.77. With a higher filler loading using 20% of the adhesive formulation 2 of the invention, the adhesive product still increased the Tensile strength 38%. The higher the filler loading the lower the cost of the finished product. The filler loading includes the calcium carbonate; the thickener (Thickner T-111 Ultrathick from Phoenix Chemical); and the foamer (Foamer Ultrafoam 565 from Phoenix Chemical). The tensile strength and elongation for each of the EXAMPLES and corresponding FIGS. 1-6 were each measured using the following method.

Test Methods used to draw films were the ASTM standard test:

1. The product was hand mixed or mixed at a very slow mix speed with a lightning mixer.
2. Viscosity was at about 5000 cps.
3. The mix was poured onto flat ceramic or flat surface with U-Line paper and using draw down bar to make the film 40,000 of an inch thick.
4. The films were dried in oven at 270 degrees F. for 1 hr.
5. The film was put under lights and all bubbles that are left were marked.
6. Standard Dog-Bones were cut from the film that does not contain bubbles.
7. Data was pulled and recorded on an Instron machine.

Example 7

An adhesive formulation 2 (ANS) of the invention was made by combining the following components:
Raw Materials % Ratio
Adhesive formulation 1 (CL-0060) 65.8 wt %
Starfix-FA-A-36-49% (resin) solids: 22.0 wt %
Starbond-30-36 (resin): 12.0 wt %
BYK®-037 (defoamer): 0.1 wt %
Nipacide Cxf (antibacterial): 4 0.1 wt %
Sub-Formulation—Carpet Latex (CL-0060)

In another embodiment, the carpet latex adhesive formulation comprises (1) de-mineralized water; (2) vinyl acetate monomer (VAM); (3) polyvinyl alcohol; (4) potassium per sulphate (PPS); (5) sodium bi-carbonate (SBC); (6) EM-031 (alkyl aryl polyethyl alcohol) as a non-ionic emulsifier; (7) an ionic emulsifier (GEOwet); (8) BYK®-037 (as a defoamer); (9) Safolite (sulphoxylate); and (10) Nipacide Cxf 4 (antibacterial). Starfix-FA-A-36 (resin); (3) (Starbond-30-36) (resin);

Raw Material % Ratio
De-mineralized water: 40.87 wt %
Vinyl Acetate Monomer (VAM): 55.54 wt %
Polyvinyl Alcohol (JP-05): 2.50 wt %
Potassium Persulphate (PPS): 0.11 wt %
Sodium Bi-Carbonate (SBC): 0.16 wt %
Non Ionic Emulsifier (EM-031): 0.30 wt %
Ionic Emulsifier (GEOwet): 0.30 wt %
Defoamer (BYK®-037: 0.04 wt %
Reducing agent—Safolite: 0.01 wt %
Nipacide Cxf (antibacterial) 0.17: wt %

The adhesive formulations in accordance with the present invention can be applied to carpets made from any of the usual fibers, such as nylons, acrylates, polyesters and wool, and can be used with all normal backing materials known in the art. Additional information with respect to the manufacture of rugs and carpets using backing adhesive compositions can be found in U.S. Pat. No. 4,239,563, which disclosure is incorporated by reference.

The foregoing disclosure has been described in some detail by way of illustration and example, for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

What is claimed is:

1. An adhesive formulation comprising de-mineralized water at about 30 wt % to about 40 wt %; polyvinyl alcohol at about 1 wt % to about 5 wt %; potassium persulphate at about 0.05 wt % to about 0.20 wt %; sodium bi-carbonate at about 0.10 wt % to about 0.30 wt %; a non-ionic emulsifier at about 0.15 wt % to about 0.45 wt %; an ionic emulsifier at about 0.15 wt % to about 0.45 wt %; a defoamer at about 0.01 wt % to about 0.10 wt %; Safolite at about 0.005 wt % to about 0.05 wt %; and a low toxicity biocide antibacterial material at about 0.10 wt % to about 0.30 wt %.

2. The adhesive formulation according to claim 1 wherein the de-mineralized water is about 41 wt %; the vinyl acetate monomer is about 55 wt %; the polyvinyl alcohol is about 2.5 wt %; the potassium per sulphate is about 0.1 wt %; the sodium bi-carbonate is about 0.16 wt %; the non-ionic emulsifier is at about 0.3 wt %; the ionic emulsifier is at about 0.3 wt %; the defoamer is at about 0.04 wt %; the sodium sulphoxylate is at about 0.01 wt %; and the antibacterial material is at about 0.17 wt %.

3. An adhesive formulation, comprising (1) the adhesive formulation 1 according to claim 1; (2) a plasticized carpet latex; (3) a waterproof additive; (4) a defoamer; and (5) an antibacterial material.

4. The adhesive formulation according to claim 3, wherein the plasticized carpet latex is a synthetic resin further comprising a tackifier material and a fine grade mineral filler material.

5. The adhesive formulation according to claim 3, wherein the waterproof additive further comprises a sealant material.

6. The adhesive formulation according to claim 3, wherein the defoamer is a volatile organic compound (VOC) lacking material.

7. The adhesive formulation according to claim 3, wherein the antibacterial material comprises a material specifically developed for the microbiological protection of water based products against any one of a bacterial and a fungal spoilage.

8. The adhesive formulation according to claim 3, wherein the adhesive formulation is from about 45 wt % to about 85 wt % of said formulation.

9. The adhesive formulation according to claim 3, wherein the plasticized carpet latex is a synthetic resin further comprising a tackifier material and a fine grade mineral filler material that is from about 10 wt % to about 35 wt % of said formulation.

10. The adhesive formulation according to claim 3, wherein the plasticized carpet latex is a synthetic resin further comprising a tackifier material and a fine grade mineral filler material being about 50 wt % of solids.

11. The adhesive formulation according to claim 3, wherein the waterproof additive further comprises a sealant material that is present at about 5 wt % to about 20 wt % of said formulation.

12. The adhesive formulation according to claim 3, wherein the defoamer is an emulsion of paraffinic mineral oils and hydrophobic components that is present at about 0.05 wt % to about 0.5 wt % of said formulation.

13. The adhesive formulation according to claim 3, wherein the antibacterial material comprises a material specifically developed for the microbiological protection of water based products against any one of a bacterial and a fungal spoilage and that is present at about 0.05 wt % to about 0.5 wt % of said formulation.

14. The adhesive formulation according to claim 3, wherein the adhesive formulation is about 66 wt % of said formulation; the plasticized carpet latex is (49 wt % solids) at about 22 wt % of said formulation; the waterproof additive further comprises a sealant material being about 12 wt % of said formulation; the defoamer comprises an emulsion of paraffinic mineral oils and hydrophobic components that is about 0.1 wt % of said formulation; and the antibacterial material comprises a material specifically developed for the microbiological protection of water based products against any one of a bacterial and a fungal spoilage that is about 0.1 wt % of said formulation.

15. An adhesive formulation 2, comprising (1) the adhesive formulation according to claim 2; (2) a plasticized carpet latex; (3) a waterproof additive; (4) a defoamer; and (5) an antibacterial, wherein the adhesive formulation 1 is about 66 wt % of said formulation; the plasticized carpet latex is a synthetic resin further comprising a tackifier material and a fine grade mineral filler material being about 22 wt % of said formulation; the waterproof additive is resin at about 12 wt % of said formulation; the defoamer is at about 0.1 wt % of said formulation; and the antibacterial material comprises a material specifically developed for the microbiological protection of water based products against any one of a bacterial and a fungal spoilage and is about 0.1 wt % of said formulation.

16. A product comprising the formulation according to claim 3 and an ethyl vinyl acetate copolymer.

17. The product according to claim 16, further comprising a filler, wherein the filler comprises water, calcium carbonate, a thickener; and a defoamer.

18. The product according to claim 17, wherein the ratio of the formulation to the ethyl vinyl acetate copolymer ranges from about 5:1 to about 7:1.

* * * * *